United States Patent Office 2,801,059
Patented July 30, 1957

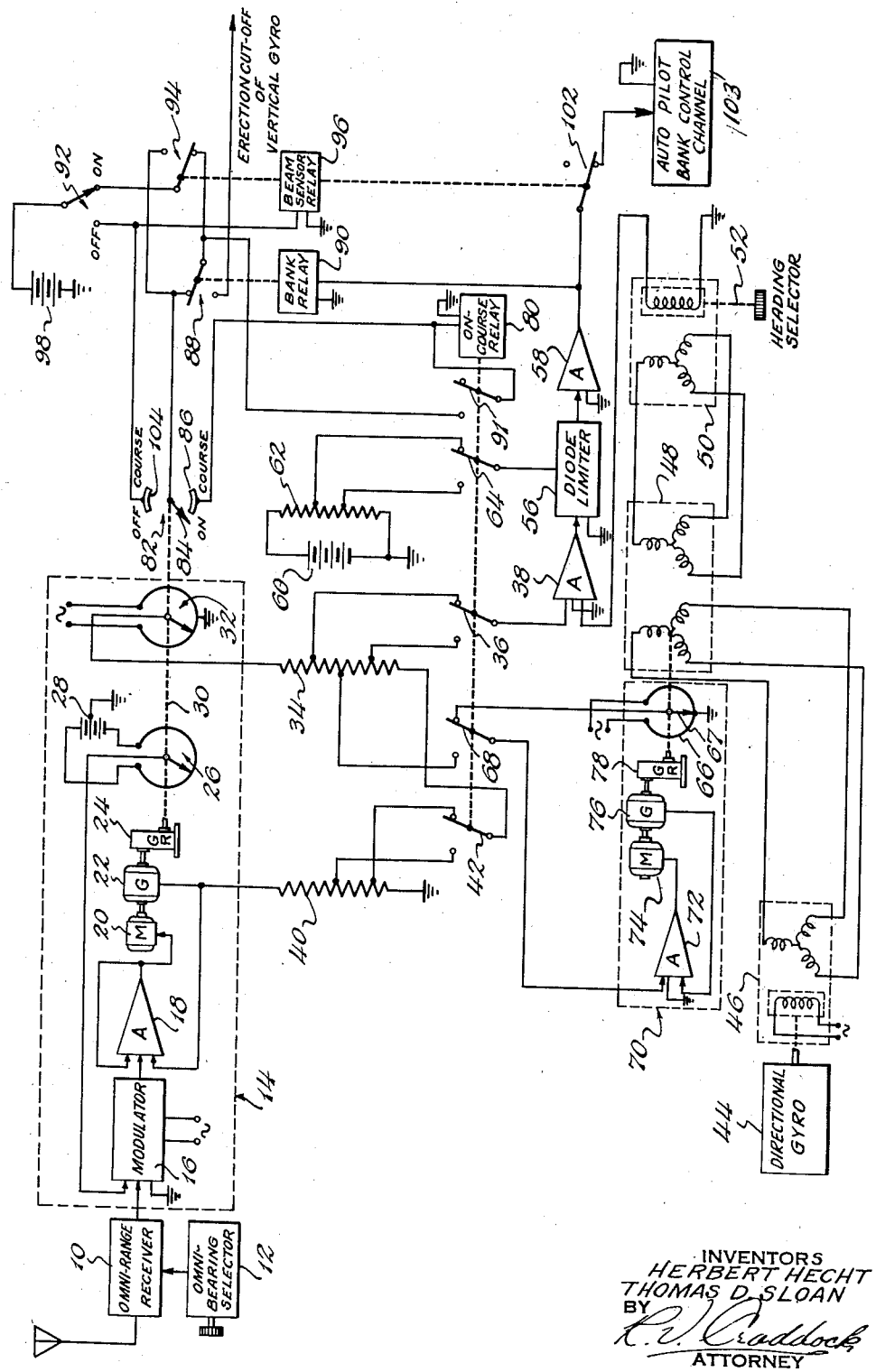

2,801,059

RADIO CONTROLLED CRAFT GUIDANCE SYSTEM

Herbert Hecht, Wantagh, and Thomas D. Sloan, Hicksville, N. Y., assignors to Sperry Rand Corporation, a corporation of Delaware Application August 2, 1954, Serial No. 447,176

16 Claims. (Cl. 244—77)

This invention relates to apparatus for automatically controlling the flight of an airplane along an omni-range beam or other radio defined course, and more particularly, is concerned with means for automatically sensing, bracketing, and coupling onto the beam.

Omni-range stations are now in common use for navigating an airplane between remote points. By means of well known visual-omni-range (V. O. R.) receiving equipment carried by the airplane, any bearing on an omni-range station can be selected by the pilot, and a cross-pointer meter in the airplane visually indicates any lateral displacement from that bearing, enabling the pilot to fly the plane toward or away from the omni-range station along the selected course. It has heretofore been proposed to fly the plane automatically, through an autopilot for example, from the lateral displacement information derived from the V. O. R. receiver. In such known systems the pilot first maneuvers the plane onto the beam and then switches over to automatic flight control. The procedure followed by the pilot in bracketing the beam and simultaneously reducing the heading and lateral displacement errors to zero by use of the cross-pointer meter is not a simple procedure. It is highly desirable therefore to provide means for automatically sensing, bracketing, and coupling onto the beam in the first instance.

Under some conditions, the automatic coupling system must utilize a large lateral displacement error signal and heading error signal in such a way that the aircraft will align itself with the beam center rapidly and with a minimum of hunting. This means that the system must be capable of imparting large bank angles to arrive quickly on the beam course without overshoot. High displacement sensitivities and rapid turn rate are not necessary or tolerable in a system designed for maintaining the airplane on the beam center because the system would tend to be unstable and would become oscillatory at closer ranges where the omni-range signals converge. Therefore, a highly damped control system with lower bank limits and other parameter changes is desired for automatically flying the aircraft on the beam center after the beam bracketing phase.

It is the general object of this invention to provide flight control apparatus for aircraft or the like which achieves fast and accurate coupling to a radio beam and yet gives smooth performance in all phases of on-course operation.

Another object of this invention is the provision of automatic flight control apparatus which automatically modifies its response characteristics depending on whether the craft is bracketing and coupling onto the beam, or the craft is flying along the center of the beam.

These and other objects of the invention which will become apparent as the description proceeds are achieved by the provision of a flight control system utilizing information from a V. O. R. receiver and a directional gyro to provide a lateral beam displacement signal, beam rate signal, a heading error signal, and an integral signal of displacement error to the bank channel of an aircraft autopilot. The relative magnitude of each of these signals is selectively controlled, relay-operated switches selecting the amount of attenuation of each signal depending on the conditions of flight, namely, the condition of coupling onto the beam or the condition of flying on the beam, as outlined above.

The relay for operating the switches in selecting the proper attenuation in these signals is controlled in response to two factors, the displacement of the aircraft from the beam center and the rate of turn of the aircraft called for by the flight control system. This relay is coupled to a potential source through two switches in series. One switch is closed in response to the lateral displacement of the aircraft from the beam center, the switch being closed when the lateral displacement of the craft from the center of the beam is substantially zero. The other switch is closed when the combined signal to the autopilot is substantially zero, calling for no turning. Thus the sensitivity of the system is modified when the craft is substantially on the center of the beam and is aligned with the beam to give proper on-beam performance, as described above.

For a better understanding of the invention reference should be had to the accompanying drawing, wherein the single figure is a schematic circuit diagram of the flight control system of the present invention.

In the drawing, the numeral 10 indicates generally an omni-range (V. O. R.) receiver which produces a D.-C. signal that goes to zero when the receiver is positioned at a particular azimuth angle with respect to the omnidirectional range radio transmitting station as selected by the omni-bearing selector 12. A receiver of this type relies upon detection of amplitude and phase modulation resulting from angular rotation of a special directional antenna pattern at the omni-directional range radio transmitting station, and upon reception of phase reference signals also transmitted from the range station. The output of the receiver is a lateral displacement signal indicative of the off-course position of the aircraft associated with the receiver.

The D.-C. output signal from the omni-range receiver 10 is connected to an electromechanical follow-up servo, indicated generaly at 14. This follow-up servo includes a modulator 16, which converts D.-C. signals to A.-C., connected to the output of the receiver 10. The A.-C. output signal of the modulator is fed to an amplifier 18 where it is amplified and coupled to a servomotor 20. Thus any output signal from the receiver 10 produces rotation of the servomotor 20, the direction of rotation depending upon the polarity of the displacement error signal from the receiver 10.

The servomotor 20 rotates a tachometer generator 22 for generating an A.-C. rate signal which is fed back to the input to the amplifier 18 to provide rate damping in conventional manner.

Coupled to the motor 20 through a suitable gear reducer 24 is the contact arm of a potentiometer 26 that is connected across a D.-C. source 28. The potential at the wiper arm of the potentiometer 26 is connected back to the modulator 16 where it is balanced against the output of the receiver 10. With a fixed signal output from the receiver 10, the motor 20 assumes an angular position in which the potential at the wiper arm of the potentiometer 26 exactly balances the output of the receiver 10, so that the angular position of an output shaft, indicated generally at 30, of the follow-up servo 14 is proportional to the lateral beam displacement of the aircraft as derived from the receiver 10.

The output shaft 30 from the follow-up servo 14 rotates the wiper arm of a center-tapped potentiometer 32 connected across a suitable A. C. source. The output signal derived from the wiper contact of the potentiometer 32 is therefore an A. C. signal which is indicative of the lateral displacement of the aircraft from the center of the beam. One of the effects of the servo 14 is to average out small variations in the displacement error signal from the receiver 10, such as may be due to distortion of the radio beam by reflection from objects on the ground. By virtue of the tachometer generator 22 in the servo 14, a signal proportional to the rate of change of beam displacement is also obtained.

The lateral displacement signal from the potentiometer 32 is connected across a voltage divider 34. A relay-operated single-pole double-throw switch 36 selectively connects one of two taps on the divider 34 to a signal mixing circuit or summing amplifier 38. Similarly the beam rate signal from the tachometer generator 22 is connected across a voltage divider 40. A relay-operated single-pole double-throw switch 42 selectively connects one of two taps on the attenuator 40 to the voltage divider 34, so that the output signal from the voltage divider 34 is proportioned to the sum of the beam displacement and beam rate signals.

Because of the beam width at large distances from the transmitter, it is essential in automatic flight control of this type to have in addition to the displacement and rate signals, a signal indicative of the heading error of the craft. Such a signal is provided in a conventional manner by means of a directional gyro, indicated generally at 44, which operates a synchro generator 46 in response to changes in heading of the aircraft. Gyro 44 may, for example, be slaved to a flux valve so as to form part of a magnetically slaved gyroscopic compass apparatus. The synchro generator 46 is connected through a differential synchro 48, the purpose of which will hereinafter be explained, to a synchro receiver 50. The desired heading of the aircraft is set into the synchro receiver manually by a heading selector knob 52. Whenever the heading indicated by the directional gyro 44 differs from the selected heading, an output error signal is produced by the synchro receiver 50, which signal is mixed with the displacement and beam rate signals from the divider 34 in the summing amplifier 38.

The combined signal from the summing amplifier 38 is coupled through a diode limiter 56 and amplifier 58 to the bank control channel of the automatic pilot. The autopilot is shown generally by the box designated by the numeral 103, and may be of a known type such as described in Patent No. 2,567,922, entitled Automatic Pilot for Aircraft invented by R. S. Brannin et al. issued September 18, 1951, and assigned to the same assignee as the present invention. The diode limiter 56 acts to limit the maximum amplitude of the signal to the autopilot thereby limiting the bank angle to some preselected maximum as determined by the bias on the diode limiter. In accordance with the present invention, since greater bank command is required during initial beam bracketing, as compared with on-course control, a selective bias control circuit is provided. This includes a D. C. voltage source 60 across which is connected a voltage divider 62. A single-pole double-throw relay-operated switch 64 selectively connects one of two taps on the divider 62 to the diode limiter circuit 56.

It is further desirable in any automatic flight control system to provide correction for cross wind. This can be done by changing the heading reference, so that the aircraft assumes a heading that exactly compensates for sidewise drift due to the cross wind. This may be done by taking an output signal from a tap on the divider 34. A single-pole double-throw relay-operated switch 68 connects the tap on the divider 34 to an electromechanical integrator 70. The integrator 70 includes an amplifier 72, the output of which is connected to a servomotor 74. A tachometer generator 76 is driven by the motor 74, the output signal from the generator 76 being fed back to the input of the amplifier 72. Thus with a constant amplitude input from the divider 34, the motor 74 rotates at a constant speed such that the output from the tachometer generator 76 substantially balances the input signal.

The motor 74 is coupled through a gear reducer 78 to the rotor winding of the differential synchro 48. By rotating the rotor of the differential synchro 48, the integrator circuit 70 introduces a change in the heading reference of the craft. When this correction is just sufficient to overcome the effect of cross winds, the displacement signal and beam rate signal will be reduced to zero and the integrator 70 will cease to rotate the differential synchro 48, so that the system stabilizes with a modified heading of the aircraft just sufficient to counterbalance the effect of cross winds.

A potentiometer 66, connected across an A. C. source, has the wiper arm 67 thereof driven by the motor 74. The wiper arm is electrically connected through the relay-operated switch 68 to the amplifier. By this means, when the integrator is not connected to the output signal from the divider 34, the motor 74 will be rotated until the potential at the wiper 67 of the potentiometer 66 is reduced to zero. This provides an initial alignment of the rotor and stator in the differential synchro 48 corresponding to a zero correction in the heading reference.

In accordance with the objects of the present invention, the switches 36, 42, 64 and 68 are actuated by an on-course relay 80 which is energized when the aircraft is near the center of the beam and aligned with the beam. Thus the displacement signal, the beam rate signal, the integrator input signal, and the bank limiter are all modified by operation of the relay 80, for optimum sensitivity and smooth operation of the system after the aircraft has coupled onto the center of the beam.

In order to operate the on-course relay 80 in response to these two conditions of the aircraft, namely, on-course and aligned with the beam, two switches are provided in series with the input to the relay 80. The first switch is a rotary sector switch indicated generally at 82, and includes a rotary contact arm 84 which is coupled to the output shaft 30 of the follow-up servo 14. The switch 82 further includes a sector contact 86 which is positioned so that the contact arm 84 will be engaged therewith when the output shaft 30 of the follow-up servo 14 indicates the aircraft to be substantially at beam center.

The second switch in series with the input of the relay 80 is a single-pole double-throw switch 88 actuated by a bank relay 90. The relay 90 is connected to the output of the amplifier 58. When there is an output signal from the amplifier 58 calling for a significant aircraft bank, the relay 90 is energized, breaking the circuit with the sector switch 82. When the aircraft is near beam center, the relay 90 is deenergized only when the heading error is small. Then a circuit is completed to the input of the relay 80.

A relay-operated switch 91, operated by the on-course relay 80, connects the relay 80 to the potential side of the switch 88. This results in a shorting out of the sector switch 82 after the relay 80 is energized, so that during the on-course phase of automatic flight, if large displacement errors are encountered the relay 80 will not drop out.

In addition to the sector switch 82 and the bank relay-operated switch 88, a make-before-break type of on-off switch 92 and a beam sensor relay-operated switch 94 may be provided, the latter being actuated by a beam sensor relay 96. The purpose of the beam sensor relay is to automatically set the flight control system into operation as the aircraft approaches the beam. A potential source 98 is provided for energizing the relays 80 and 96. When the switch 92 is in the off position, the beam sensor relay 96 is connected to the source 98, so that the switch 94 connects the "on" contact of the switch 92 to the arm 84 of the sector switch 82.

In operation, as the aircraft flies toward the beam, the switch 92 is first turned to the "on" position. While the beam sensor relay 96 is energized, the output from the amplifier 58 is disconnected from the automatic pilot by means of a relay-operated "on-off" switch 102 actuated by the relay 96. The beam sensor relay 96 is maintained in its energized state by means of the sector switch 82, which is provided with an off-course sector contact 104. This off-course contact is contacted by the rotary arm 84 only when the aircraft is outside the normal confines of the beam. Thus a circuit is completed between the source of potential 98 and the beam sensor relay 96 through the sector switch 82 and the relay-operated switch 94 in the initial off-course condition of the aircraft, the latter switch connecting the rotary arm 84 of the sector switch 82 to the "on" terminal of the switch 92 and hence, to the potential source 98, when the relay 96 is energized.

As the aircraft approaches the beam, the rotary switch 82 is actuated so as to rotate the arm 84 out of contact with the sector 104. As a result, the relay 96 is deenergized, closing the switch 102 and connecting the source 98 to the bank relay-operated switch 88. At the same time the beam sensor relay 96, when deenergized, closes the switch 102, putting the automatic pilot under the control of the beam control circuit. If there is an output signal from the amplifier 58 calling for an aircraft bank, the bank relay 90 will be actuated so that the switch 88 will be disconnected from the control arm 84 of the sector switch 82 at the same time the switch 88 acts to connect the potential source 98 to the erection cut-off of the vertical gyro (not shown) associated with the automatic pilot. It is common practice to cut off the erection control of the vertical gyro while the plane is maneuvering. See for example Patent No. 2,636,699, entitled Automatic Pilot for Aircraft invented by G. F. Jude et al. issued April 28, 1953, and assigned to the same assignee as the present invention.

When the plane is substantially on-course and flying in a manner so as to be substantially aligned with the center of the beam, the sector switch 82 is closed and the bank relay 90 is deenergized, thus connecting the on-course relay 80 to the potential source 98. Energization of the on-course relay 80 results in decreasing the magnitude of the displacement and rate signals by the switches 36 and 42, decreasing the positive bias on the diode limiter by switch 64 (to decrease the maximum bank signal) and establishing an input to the integrator 70 by the switch 68 to modify the performance characteristics of the automatic flight control system when the aircraft is flying on-course. It should be noted that the relay-operated switches 36, 42, 64, 68 and 91 are illustrated in the drawing in their bracketing phase condition, that is, their position when the relay 80 is deenergized.

In the above description it will be seen that the various objects of the invention have been achieved by the provision of an automatic flight control system in which the control characteristics are modified depending upon whether the aircraft is in a beam bracketing phase or is flying an on-course phase. Two conditions must simultaneously exist to institute the modification in the control characteristics. First, the aircraft must be substantially on the center of the beam and second, the aircraft must have a heading parallel to the beam. The first condition is imposed since it is possible that, although the aircraft is off-course, it may not be banking. This would be the condition where the heading error signal would exactly counterbalance the displacement and rate signals. In such circumstance the plane flies a substantially constant heading as it approaches the center of the beam. The second condition is imposed because it is possible that the aircraft, although it is on the center of the beam, is flying through the beam at an angle and therefore is in the process of turning to come back onto the beam. It will be understood that if the displacement error signal and the heading error signal are substantially zero, the plane must be on-course. Therefore sensing of these two conditions may be made from the displacement and heading signals, as well as from the displacement and resultant of the sum of the displacement and heading error signals as in the preferred embodiment described.

Since many changes could be made in the above construction and many apparently widely different embodiments of this invention could be made without departing from the scope thereof, it is intended that all matter contained in the above description or shown in the accompanying drawings shall be interpreted as illustrative and not in a limiting sense.

What is claimed is:

1. A flight control system for an aircraft comprising a radio receiver for producing a lateral beam displacement signal, an electromechanical follow-up servo coupled to the output of the receiver for producing smoothed beam displacement and beam rate signals, a first voltage divider having a plurality of output taps and being connected to the displacement signal output of the follow-up servo, a second voltage divider having a plurality of output taps and being connected to the rate signal output of the follow-up servo, a first relay-operated on-off switch connecting an output tap of the second voltage divider to the first voltage divider whereby the output voltage of the second voltage divider is added to the output voltage of the first voltage divider, a summing amplifier, a first single-pole double-throw relay-operated switch for selectively connecting two different taps of the first voltage divider to the summing amplifier, an electromechanical servo integrator, a second on-off switch for connecting the input to the integrator to an output tap on the first voltage divider, a synchro generator actuated in accordance with heading changes of said aircraft, a differential synchro electrically connected to the synchro generator and mechanically actuated by the integrator, a heading selector synchro receiver electrically connected to the differential synchro, the output of the synchro receiver being coupled to the input of the summing amplifier, a diode limiter coupled to the output of the summing amplifier, said limiter including a relay-operated bias switch for selectively changing the diode limiter bias voltage, an autopilot having a bank control channel, means including a third relay-operated on-off switch connecting the output of the diode limiter to the autopilot bank channel, a rotary sector switch mechanically actuated by the follow-up servo, the switch having a rotary wiper arm and two sector contacts, the contacts being respectively positioned at the regions of movement of the wiper arm corresponding to a maximum off-center beam displacement signal and an on-center beam displacement signal, a second relay-operated single-pole double-throw switch, a beam sensor relay for actuating said third on-off switch and said second single-pole double-throw switch, a potential source, means for connecting the beam sensor relay to the potential source, the relay when energized actuating said switches to connect the wiper arm of the sector switch to the potential source and disconnect the autopilot from the output of said diode limiter, the beam sensor relay being connected to the off-beam sector of the sector switch, a bank relay coupled to the output of the limiter, a switch actuated by the bank relay, said last-named switch connecting the potential source to the wiper arm of the sector switch when both the beam sensor relay and the bank relay are deenergized, and a range on-course relay connected to the on-center sector of the sector switch, the range on-course relay actuating said first and second on-off switches, said first single-pole double-throw switch, and said bias switch.

2. A flight control system for an aircraft comprising a radio receiver for producing a lateral beam displacement signal, an electromechanical follow-up servo coupled to the output of the receiver for producing smoothed beam displacement and beam rate signals, a first voltage divider having a plurality of output taps and being connected to the displacement signal output of the follow-up servo, a second voltage divider having a plurality of output taps and being connected to the beam rate signal output of the follow-up servo, a first relay-operated on-off switch connecting an output tap of the second voltage divider to the first voltage divider, a summing amplifier, a first single-pole double-throw relay-operated switch for selectively connecting two different output taps of the first voltage divider to the summing amplifier, an electromechanical servo integrator, a second relay-operated on-off switch for connecting an output tap of the first voltage divider to the integrator, a synchro generator actuated in accordance with heading changes of said aircraft, a differential synchro electrically connected to the synchro generator and mechanically actuated by the integrator, a heading selector synchro receiver electrically connected to the differential synchro, the output of the synchro receiver being coupled to the input of the summing amplifier, a diode limiter coupled to the output of the summing amplifier, said limiter including a relay-operated bias switch for selectively changing the diode limiter bias voltage, an autopilot having a bank control channel, means including a third relay-operated on-off switch connecting the output of the limiter to the autopilot bank channel, a rotary sector switch mechanically actuated by the electromechanical follow-up servo, the switch having a rotary wiper arm and at least one sector contact, the contact being positioned at the region of movement of the wiper arm corresponding to an on-center beam displacement signal, a bank relay coupled to the output of the limiter, a switch actuated by the bank relay, said last-named switch connecting a potential source to the wiper arm of the sector switch when the bank relay is deenergized, and a range on-course relay connected to the on-center sector of the sector switch, the range on-course relay actuating said first and second on-off switches, said first single-pole double-throw switch, and said bias switch.

3. A flight control system for an aircraft comprising means for producing an output indicative of the displacement of the aircraft from a predetermined flight path, a first multi-tap voltage divider connected to the output of the displacement indicative means, signal mixing means, a first switch for selectively connecting different taps of the first voltage divider to the signal mixing means, means for producing an output indicative of the rate of change of displacement of the aircraft from the flight path, a second multi-tap voltage divider connected to the output of the displacement rate means, means including a second switch for selectively coupling different taps of the second voltage divider to the signal mixing means, an integrator, a third switch for connecting a tap of the first voltage divider to the integrator, means for producing an output indicative of the deviation of the aircraft from a preselected heading, means for producing an output proportional to the difference between the output of the integrator and the heading indicative means, said last-named means being coupled to the input of said signal mixing means, means including a fourth switch coupled to the output of said signal mixing means for limiting the amplitude of the output signal from the mixing means, the fourth switch selectively changing the maximum output amplitude set by the limiting means, an autopilot having a bank control channel connected to the output of the limiting means, a rotary sector switch actuated by the output of the displacement indicative means, the switch having a rotary wiper arm and at least one sector contact, the contact being positioned at the region of movement of the wiper arm corresponding to substantially zero displacement, a bank relay coupled to the output of the limiting means, a switch actuated by the bank relay, said last-named switch connecting a potential source to the wiper arm of the sector switch when the bank relay is deenergized, and a range on-course relay connected to said zero displacement sector of the sector switch, the range on-course relay actuating said first, second, third and fourth switches.

4. Apparatus for guiding a craft along a selected course as established by a radio beam from a transmitting station, said apparatus comprising means including a radio receiver for producing a first signal varying according to the change in displacement of the craft from the course, means including a first switch coupled to the output of the first signal producing means for selectively modifying the first signal, means for producing a second signal varying according to the rate of change in displacement of the craft from the course, means including a second switch coupled to the output of the second signal producing means for selectively modifying the second signal, signal integrating means, means including a third switch for selectively coupling the input of the integrating means to the output of the first signal producing means, means for producing a third signal varying according to deviation of the heading of the craft from a selected heading, means for producing an output proportional to the difference between the output of the integrating means and the third signal producing means, means coupled to the output of said difference signal producing means, the output of the first signal modifying means, and the output of the second signal modifying means for combining the output signals thereof, means including a fourth switch responsive to the resultant output of the signal combining means for limiting the magnitude of the resultant output, the fourth switch selectively changing the maximum output from the limiting means, means for actuating said first, second, third, and fourth switches to reduce the magnitude of the first and second signals, connect the first signal to the integrator, and reduce the maximum amplitude level of the resultant signal, said last-named means including means responsive to the displacement of the aircraft from the selected course and means responsive to the resultant output from the limiting means, said first, second, third, and fourth switches being actuated by the switch actuating means only when both the first signal and the resultant signal drop below a predetermined level, and utilization means responsive to the resultant signal from the limiting means for guiding the craft in response thereto.

5. A flight control system for an aircraft comprising means for producing an output indicative of the displacement of the aircraft from a predetermined flight path, a multi-tap voltage divider connected to the output of the displacement indicative means, signal mixing means, a first switch for selectively connecting different taps of the voltage divider to the signal mixing means, an integrator, a second switch for connecting a tap of the voltage divider to the integrator, means for producing an output indicative of the deviation of the aircraft from a preselected heading, means for producing an output proportional to the difference between the output of the integrator and the heading indicative means, said last-named means being coupled to the input of said signal mixing means, a signal limiter coupled to the output of said signal mixing means, a third switch for selectively changing the limiting value of said limiter, an autopilot having a bank control channel, means for coupling the output of the limiter to the autopilot bank channel, and means responsive to the displacement indicative means and the output of the limiter for actuating all of said switches.

6. A flight control system for an aircraft comprising a radio receiver for producing a lateral beam displacement signal, an electromechanical follow-up servo coupled to the output of the receiver for producing a smoothed beam displacement signal, a multi-tap displacement signal voltage divider connected to the displacement signal output of said servo, a signal limiter circuit including a first relay-operated switch for selectively changing the limiting value of said circuit, means including a second relay-operated switch for selectively coupling the output signal at different taps of said voltage divider to the limiter circuit, an autopilot having a bank control channel, a relay-operated on-off switch coupling the output from the limiter circuit to the autopilot bank channel, a rotary sector switch mechanically actuated by the electromechanical follow-up servo, the switch having a rotary wiper arm and two sector contacts, the contacts being respectively positioned at the regions of movement of the wiper arm corresponding to a maximum off-center beam displacement signal and an on-center beam displacement signal, a relay-operated single-pole double-throw switch, a beam sensor relay for actuating said on-off switch and said last-named single-pole double-throw switch, a potential source, means for connecting the beam sensor relay to the potential source, the relay when energized actuating said on-off switch and said single-pole double-throw switch to connect the wiper arm of the sector switch to the potential source and disconnect the autopilot bank channel, the beam sensor relay being connected to the off-beam sector of the sector switch, a bank relay coupled to the output from the limiter circuit, a switch actuated by the bank relay, said last-named switch connecting the potential source to the wiper arm of the sector switch when both the beam sensor relay and the bank relay are deenergized, and a range on-course relay connected to the on-center sector of the sector switch, the range on-course relay actuating said first and second relay-operated switches.

7. Apparatus for guiding a craft along a selected course as established by a radio beam from a transmitting station, said apparatus comprising means including a radio receiver for producing a first signal varying according to the change in displacement of the craft from the course, means including a first switch coupled to the output of the first signal producing means for selectively modifying the first signal, signal integrating means, means including a second switch for selectively coupling the input of the integrating means to the output of the first signal producing means, means for producing a second signal varying according to deviation of the heading of the craft from a selected heading, means for producing an output proportional to the difference between the output of the integrating means and the second signal producing means, means coupled to the output of said difference signal producing means and the output of the first signal modifying means for combining the output signals thereof, means including a third switch responsive to the resultant output of the signal combining means for limiting the magnitude of the resultant output, the third switch selectively changing the maximum output from the limiting means, means for actuating said first, second, and third switches to reduce the magnitude of the first signal, connect the first signal to the integrator, and reduce the maximum amplitude level of the resultant signal, said last-named means including means responsive to the displacement of the aircraft from the selected course and means responsive to the resultant output from the limiting means, said first, second and third switches being actuated by the switch actuating means only when both the first signal and the resultant signal drop below a predetermined level, and utilization means responsive to the resultant signal from the limiting means for guiding the craft.

8. Apparatus for guiding a craft along a selected course as established by a radio beam from a transmitting station, said apparatus comprising means including a radio receiver for producing a first signal varying according to the change in displacement of the craft from the course, means including a first switch coupled to the output of the first signal producing means for selectively modifying the first signal, means for producing a second signal varying according to deviation of the heading of the craft from a selected heading, means coupled to the output of said second signal producing means and the output of the first signal modifying means for combining the output signals thereof, means including a second switch responsive to the resultant output of the signal combining means for limiting the magnitude of the resultant output, the second switch selectively changing the maximum output from the limiting means, means for actuating said first and second switches to reduce the magnitude of the first signal and reduce the maximum amplitude level of the resultant signal, said last-named means including means responsive to the displacement of the aircraft from the selected course and means responsive to the resultant output from the limiting means, said first and second switches being actuated by the switch actuating means only when both the first signal and the resultant signal drop below a predetermined level, and utilization means responsive to the resultant signal from the limiting means for guiding the craft.

9. A flight control system for an aircraft comprising means for producing an output indicative of the displacement of the aircraft from a predetermined flight path, a multi-tap voltage divider connected to the output of the displacement indicative means, a limiter circuit including a first relay-operated switch for selectively changing the limiting value of said circuit, means including a second relay-operated switch for selectively connecting different taps of the voltage divider to the limiter circuit, an autopilot having a bank control channel, means for coupling the output of the limiter circuit to the autopilot bank channel, a relay for simultaneously actuating all of said relay-operated switches, a source of potential, and first and second switching means connecting the source of potential to the relay, the first switching means being actuating in response to the displacement indicative means and the second switching means being actuated in response to the output of the limiter circuit.

10. A flight control system for an aircraft comprising means including a radio receiver for producing a lateral beam displacement signal, a multi-tap voltage divider connected to the displacement signal output of said means, an autopilot having a bank control channel, means including a relay-operated switching means for selectively coupling the output signal at different taps of said voltage divider to the bank channel of the autopilot, a relay for actuating said relay-operated switching means, a source of potential, and switching means connecting the source of potential to the relay, the switching means being actuated in response to the lateral displacement signal from the receiver.

11. In an aircraft automatic flight control system, autopilot means for controlling the course of the aircraft, means for producing a control signal in response to the displacement of the aircraft from a predetermined flight path, means for producing a control signal in response to the rate of change of displacement of the aircraft with respect to said predetermined flight path, means for producing a control signal in response to the deviation in heading of the aircraft from a predetermined heading, means for modifying said heading signal in response to a constant displacement signal, means for combining and summing said control signals, the resultant of the combined signals actuating the autopilt means to bring and maintain the aircraft on said predetermined flight path, switching means associated with each of said signal producing means for selecting signals of different magnitude, and means for actuating said switching means including means responsive to the displacement of the aircraft from said predetermined course and means responsive to the combined signals, the switching means being actuated only when both the displacement and the resultant of the combined signals are substantially zero, whereby the response of the aircraft to the automatic flight control signals is modified when the aircraft is flying along said predetermined flight path.

12. Apparatus as defined in claim 11 further including means for limiting the maximum turning rate of the aircraft and means for selectively modifying said means for controlling the maximum turning rate, said last-named means including said switching means, whereby the maximum turning rate is also modified when the aircraft is flying substantially along said predetermined flight path.

13. In an aircraft automatic flight control system, autopilot means for controlling the course of the aircraft, means for producing a control signal in response to the displacement of the aircraft from a preselected flight path, means for producing a control signal in response to the deviation in heading of the aircraft from a predetermined heading, means for combining and summing said signals, the resultant of the combined signals actuating the autopilot means to bring the aircraft onto said predetermined flight path, switching means associated with each of said signal producing means for selecting signals of different magnitude, and means for actuating said switching means including means responsive to the displacement of the aircraft from said preselected course and means responsive to the combined signals, the switching means being actuated only when both the displacement and the resultant of the combined signals are substantially zero, whereby the response of the aircraft to the automatic flight control signals is modified when the aircraft is flying along said preselected flight path.

14. Apparatus for use in guiding an aircraft along a selected course, said apparatus comprising means for producing a first signal of amplitude proportional to the displacement of the aircraft from the course, means including a switch coupled to the output of the first signal producing means for selectively modifying the amplitude of the displacement signal with any given displacement of the aircraft, means for producing a second signal of amplitude proportional to the deviation of the aircraft heading from a selected heading, means coupled to the output of the amplitude modifying means and the second signal producing means for combining the output signals thereof, and means for actuating said switch to change the amplitude of the first signal, said last-named means including means responsive to the displacement of the aircraft from the selected course and means responsive to the resultant output of the signal combining means, the switch being actuated by said switch actuating means only when both the displacement of the aircraft and resultant signal drop below a predetermined level.

15. Apparatus for use in guiding an aircraft along a selected course, said apparatus comprising means for producing a first signal of amplitude proportional to the displacement of the aircraft from the course, means coupled to the output of the first signal producing means for selectively modifying the amplitude of the displacement signal with any given displacement of the aircraft, means for producing a second signal of amplitude proportional to the deviation of the aircraft heading from a selected heading, means coupled to the output of the amplitude modifying means and the second signal producing means for combining the output signals thereof, and means for actuating said first signal modifying means to change the amplitude of the first signal, said last-named means including means responsive to the displacement of the aircraft from the selected course and means responsive to the resultant output of the signal combining means.

16. Apparatus for use in guiding an aircraft along a selected course, said apparatus comprising means for producing a first signal of amplitude proportional to the displacement of the aircraft from the course, means for selectively modifying the ratio of change in signal amplitude of the displacement signal with a given change in beam displacement of the aircraft, means for producing a second signal of amplitude proportional to the deviation of the aircraft heading from a selected heading, and means responsive to the amplitudes of the first and second signals for automatically actuating said modifying means to select a different predetermined ratio when the first and second signals are substantially reduced to zero.

References Cited in the file of this patent

UNITED STATES PATENTS

| 2,496,809 | Moseley | Feb. 7, 1950 |
| 2,575,890 | Perkins et al. | Nov. 20, 1951 |